(12) United States Patent
Bouche et al.

(10) Patent No.: US 9,058,136 B2
(45) Date of Patent: Jun. 16, 2015

(54) DEFINING REUSABLE ITEMS IN PRINTER-READY DOCUMENT TO INCLUDE ALL GRAPHIC ATTRIBUTES FOR REPRODUCING REUSABLE ITEMS INDEPENDENTLY OF EXTERNAL CONDITIONS

(71) Applicant: Xerox Corporation, Norwalk, CT (US)

(72) Inventors: Jean-Yves Rene Marius Bouche, Saint-Martin d'Uriage (FR); David Nigel Roderic Kirk, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/065,758

(22) Filed: Oct. 29, 2013

(65) Prior Publication Data

US 2015/0116744 A1   Apr. 30, 2015

(51) Int. Cl.
*G06F 3/12* (2006.01)
(52) U.S. Cl.
CPC ............ *G06F 3/1203* (2013.01); *G06F 3/1244* (2013.01); *G06F 3/1284* (2013.01)
(58) Field of Classification Search
None
See application file for complete search history.

(56) References Cited

U.S. PATENT DOCUMENTS

| 6,441,919 | B1 | 8/2002 | Parker et al. | |
| 7,391,529 | B2 | 6/2008 | Glaspy, Jr. et al. | |
| 8,233,185 | B2 | 7/2012 | Gordon et al. | |
| 8,422,041 | B2 | 4/2013 | Matsuda | |
| 8,433,997 | B1 * | 4/2013 | Szabo | 715/209 |
| 2002/0165883 | A1 * | 11/2002 | Sans et al. | 707/530 |
| 2006/0290961 | A1 * | 12/2006 | Low et al. | 358/1.13 |

* cited by examiner

*Primary Examiner* — Marcus T Riley
(74) *Attorney, Agent, or Firm* — Gibb & Riley, LLC

(57) ABSTRACT

Methods and systems receive an electronic document into a computerized device. The electronic document contains reusable items. The methods and systems herein render the electronic document into a printer-ready format using the computerized device to produce a printer-ready document and output the printer-ready document from the computerized device. The rendering process creates objects for the reusable items within the printer-ready document as the reusable items are encountered during the rendering. The objects are created to be uninfluenced by the graphic state of the current page in the printer-ready document. The methods and systems also store the objects in a non-transitory storage medium of the computerized device as the objects are created. Then, as the reusable items are re-encountered during the rendering process, these methods and systems simply reference the previously created object in the storage.

20 Claims, 4 Drawing Sheets

DEFINING REUSABLE ITEMS IN PRINTER-READY DOCUMENT TO INCLUDE ALL GRAPHIC ATTRIBUTES FOR REPRODUCING REUSABLE ITEMS INDEPENDENTLY OF EXTERNAL CONDITIONS

BACKGROUND

Systems and methods herein generally relate to image processing and more particularly to uses of files that contain printer-ready or display-ready data.

One type of graphic processing file is a print-ready file commonly known as a Portable Document Format (PDF) file. PDF is a file format used to represent documents in a manner that is independent of application software, hardware, and operating systems and was created by Adobe Systems®, San Jose, Calif., USA. Each PDF file encapsulates a complete description of a fixed-layout flat document, including the text, fonts, graphics, and other information needed to display or print the document.

A form XObject is a way of grouping a number of PDF objects together. For example, every element that makes up an item in a document can be a XObject. This allows a form XObject to be defined once in a PDF file, and used several times, which is particularly useful when combining pages or parts of pages from multiple PDF documents. Form XObjects are also used in Open Prepress Interface (OPI) workflows where the low-resolution preview of an image will be stored inside a Form XObject and the OPI information will be attached to the Form XObject. OPI workflows use a network server to store images in order to reduce memory required for high-resolution document image layout.

PostScript (PS) is a computer language for creating vector graphics developed by Adobe Systems®. PS is a dynamically typed, concatenative programming language and is best known for its use as a Page Description Language (PDL) in the electronic and desktop publishing areas.

When processing a PS job to create a PDF file, Adobe Distiller® or Normalizer® translates a PS form definition into a PDF XObject through the PS operator "execform." Because XObjects are created when execform is executed, several XObjects may be created from the same PS form even when many of the XObjects are not necessary. This occurs because execform may detect different graphic states and decide to create another XObject even when the differences in the graphic states have no influence on the XObject itself. For large Variable Data Printing (VDP) jobs, these unnecessary XObjects can have a very significant impact on the time required to create the PDF and its final size.

SUMMARY

Exemplary methods herein receive an electronic document (e.g., a PostScript file) into a computerized device. The electronic document contains reusable items and methods herein define such reusable items that are in the electronic document in a way that each of the reusable includes all graphic attributes needed to reproduce the reusable items independently of external conditions (such as the graphic state of a page in a printer-ready document). The methods herein render the electronic document into a printer-ready format using the computerized device to produce the printer-ready document (e.g., PDF file) and output the printer-ready document from the computerized device.

The rendering process creates objects (e.g., XObjects) for the reusable items within the printer-ready document as the reusable items are encountered during the rendering. The objects are created to be uninfluenced by the graphic state of the current page in the printer-ready document. The methods also store the objects in a non-transitory storage medium (e.g., library) of the computerized device as the objects are created. Then, as the reusable items are re-encountered during the rendering process, these methods simply reference the previously created object in the library.

The electronic document can be a variable data print job used to create many different specialized copies of a main document. Thus, different copies of the main document can be different from one another based on variable data or variable information within the variable data print job. The reusable items within the electronic document can be graphical items and/or text items, and the printer-ready document is independent of applications used to create the electronic document. The graphic state describes various graphic parameters, such as line attributes, clipping paths, coordinate systems, color spaces, text attributes, etc.

Various computerized devices herein include an interface device (e.g., an input/output device) receiving an electronic document. The electronic document again comprises reusable items. A processor is operatively connected to the interface device. The processor renders the electronic document into a printer-ready format to produce a printer-ready document. The interface device outputs the printer-ready document from the computerized device.

The rendering process defines such reusable items that are in the electronic document in a way that each of the reusable includes all graphic attributes needed to reproduce the reusable items independently of external conditions (such as the graphic state of a page in a printer-ready document). Further, this process creates objects for the reusable items within the printer-ready document as the reusable items are encountered during the rendering. The objects are created to be uninfluenced by the graphic state of the current page in the printer-ready document. The methods also store the objects in a non-transitory storage medium (e.g., library) of the computerized device as the objects are created. Then, as the reusable items are re-encountered during the rendering process, these methods simply reference the previously created object in the library.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
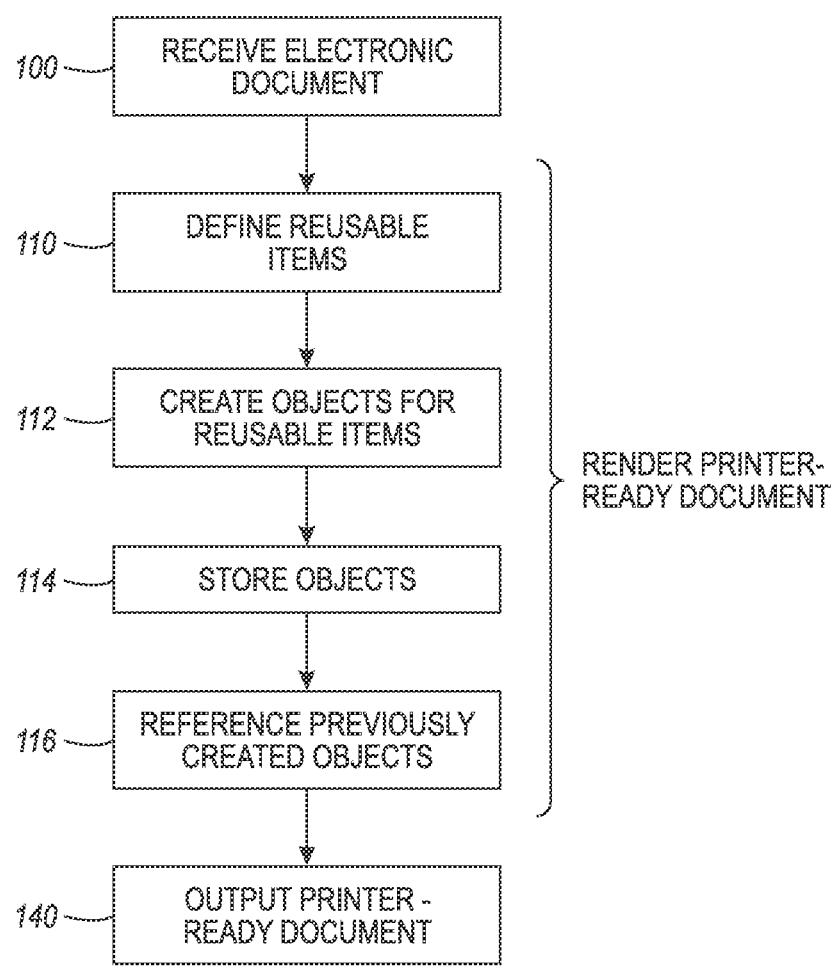
FIG. 1 is a flow diagram of various methods herein.

As mentioned above, when translating a PS form definition into a PDF XObject, unnecessary XObjects may be created and such unnecessary XObjects can have a very significant impact on the time required to create the PDF and its final size. Therefore, the systems and methods herein eliminate the creation of such unnecessary XObjects to decrease the size of, and time required to create, the PDF.

More specifically, systems and methods herein bypass the execution of execform and directly create a unique XObject associated with each PS form. By using systems and methods herein, the time required to create a PDF file out of a large VDP job and the size of the PDF are drastically reduced, resulting in a much more efficient production workflow. This is made possible because the systems and methods herein have full control of the graphic state and ensure that the PS forms created have no dependency on the graphic state at the time the form is rendered on the page.

The graphics state is a set of parameters that control graphics operations. The graphic state comprises parameters such as attributes of a line used to stroke a path (line attributes), the current clipping path (clipping paths, which limit the regions of the page affected by painting operators), the current transformation matrix (coordinate systems), the current color and the color space (color spaces) and various attributes related to text (text attributes).

When running in the Adobe Normalizer PostScript interpreter, the systems and methods herein still create PS forms (the reusable items in the PS job) out of its various caching mechanisms; however, when a PS form is first invoked by one of the commands used to render a form on the page, with systems and methods herein, the execution of execform is replaced by the creation of an XObject through the unique pdfmark statements.

The pdfmark operator is a PostScript extension implemented in Acrobat Distiller. Using a pdfmark operator, many non-layout-related features of a PDF file can be defined in the original document or in the corresponding PostScript code. When using pdfmark operators, hypertext features are automatically generated when distilling the PostScript file.

In one specific example, with systems and methods herein, the execution of execform is replaced by the creation of a XObject through the Begin Prolog and End Prolog (/BP and /EP) pdfmark statements. In this example, the object itself is then rendered through the Show Picture (/SP) pdfmark statement and the XObject name and form name are registered in a dictionary for subsequent mapping. On subsequent invocation of the same PS form, the dictionary is queried using the form name, the matching XObject is retrieved, and only the /SP pdfmark statement is executed to render it again on the current page.

Very shortly into the PDF rendering process most of the XObjects have been created and the pages begin to be rendered at very high speed. Thus, with systems and methods herein, large VDP production jobs of tens thousands of pages can be turned into PDF files in a very short timeframe.

FIG. 1 is flowchart illustrating exemplary methods herein. In item 100, these methods receive an electronic document into a computerized device. The electronic document can be any form of document, whether currently known or developed in the future, that may be rendered into a printer-ready format. For example, the electronic document may comprise a PS file, a PPML (personalized print markup language) file, which is an XML-based language for variable-data printing, any word-processing files document files (.doc) from Microsoft Corp, Redmond Wash., USA, rich text files (.rtf), text files (.txt), PowerPoint files (.ppt) from Microsoft Corp, GIF files, TIFF files, JPEG files, etc.

The electronic document can contain reusable items and can be a variable data print job used to create many different specialized versions of a main document. Thus, different versions of the main document can be different from one another based on variable data or variable information within the variable data print job. The reusable items within the electronic document can be graphical items and/or text items, and the printer-ready document is independent of applications used to create the electronic document.

In items 110-114, the methods herein render the electronic document into a printer-ready format using the computerized device to produce a printer-ready document and, in item 140, these methods output the printer-ready document from the computerized device. The printer-ready format can comprise any file that is ready to be rasterized by the digital front end of a printing device, whether currently known or developed in the future, and can include for example, PDF files, ASCII files, Printer Command Language (PCL) files, formatted text (PRN) files, Design Web Format (DWF) files, Pre-Linked Transfer (PLT) files, Vector Image Compressed (VIC) files, Layered Document Format (LDF) files, etc.

In item 110, the rendering process defines such reusable items that are in the electronic document in a way that each of the reusable items includes all graphic attributes needed to reproduce the reusable items independently of external conditions (such as the graphic state of a page in a printer-ready document). When the PS interpreter (as modified by the methods and systems herein) creates the PS forms, it has full control of the graphic state and creates each PS form to not be dependent upon the graphic state of the page. In other words, each PS form contains all the graphic states/attributes and therefore it does not depend on anything external, such as the initial graphic state of a page.

In item 112, this process creates objects (e.g., XObjects) for the reusable items (e.g., PS forms) within the printer-ready document as the reusable items are encountered during the rendering. The objects are created to be uninfluenced by (are not influenced by) the graphic state of the current page in the printer-ready document because each PS form upon which the objects are based contains all the graphic states and attributes and, therefore, like the PS form, the object will also not depend on anything external. Therefore, the objects are also self-contained (include all graphic attributes needed to reproduce the reusable items independently of external conditions) because they are based on reusable objects that are also self-contained (include all graphic attributes needed to reproduce the reusable items independently of external conditions).

In item 114, the methods store the objects in a non-transitory storage medium (e.g., library) of the computerized device as the objects are created. In item 116, as the reusable items are re-encountered during the rendering process, these methods simply reference the previously created object in the library. The graphic state describes various graphic parameters, such as line attributes, clipping paths, coordinate systems, color spaces, text attributes, etc.

Figure 2:
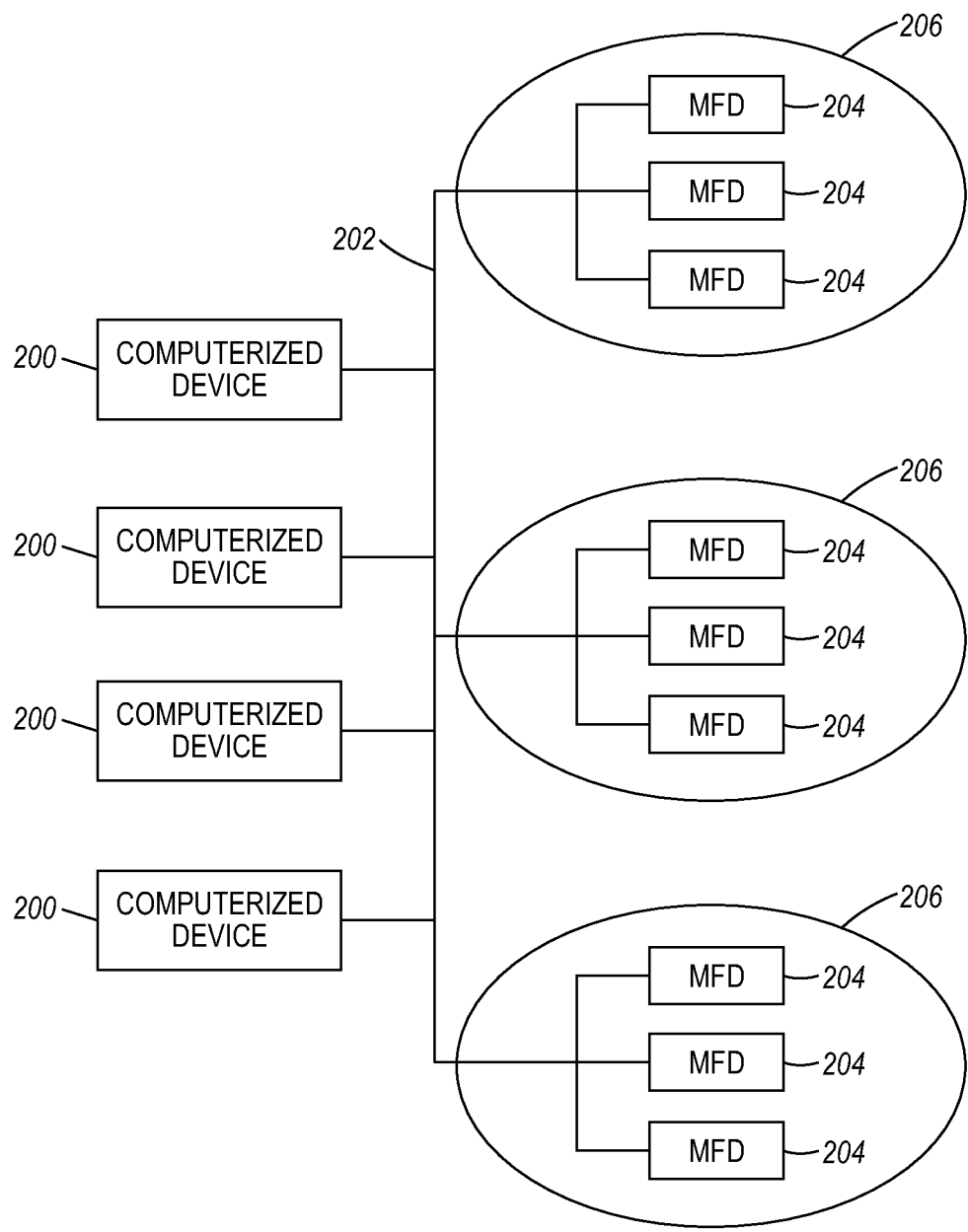
FIG. 2 is a schematic diagram illustrating systems herein.

The devices and methods described herein can be included on a single device, multiple devices, or may be shared over local or wide area networks. As shown in FIG. 2, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
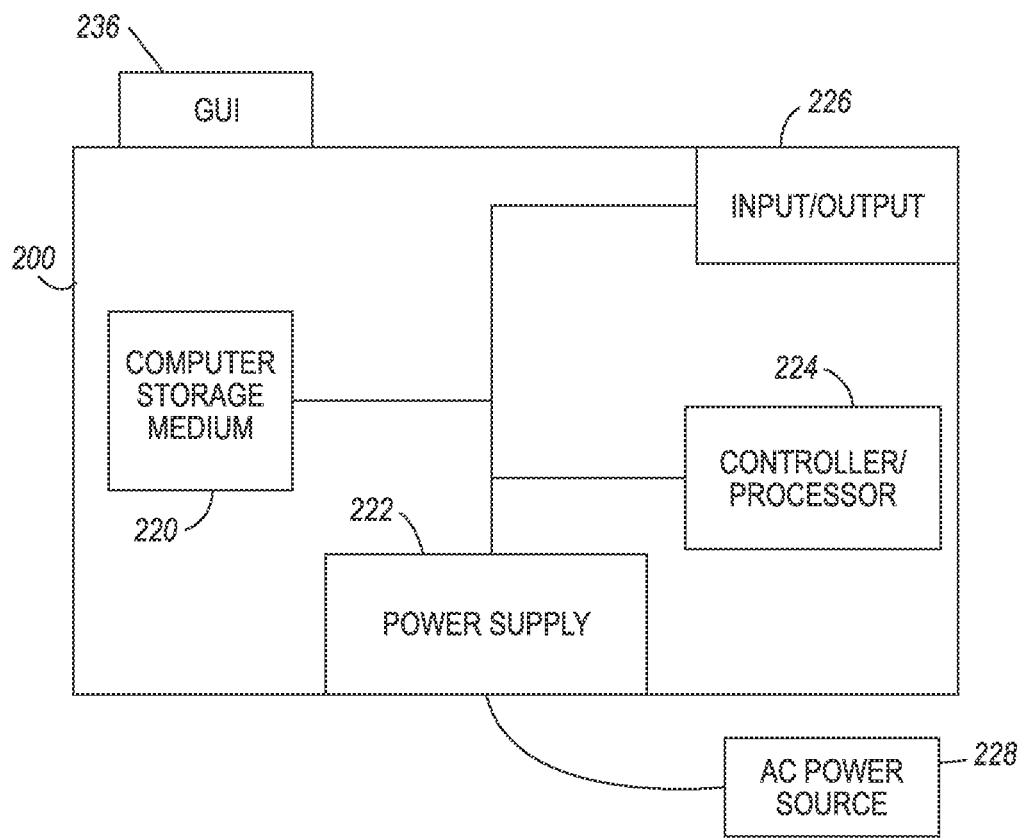
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236, that also operates on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 2, a body housing has one or more functional components that operate on power supplied from an alternating current (AC) source 228 by the power supply 222. The power supply 222 can comprise a power storage element (e.g., a battery, etc).

Figure 4:
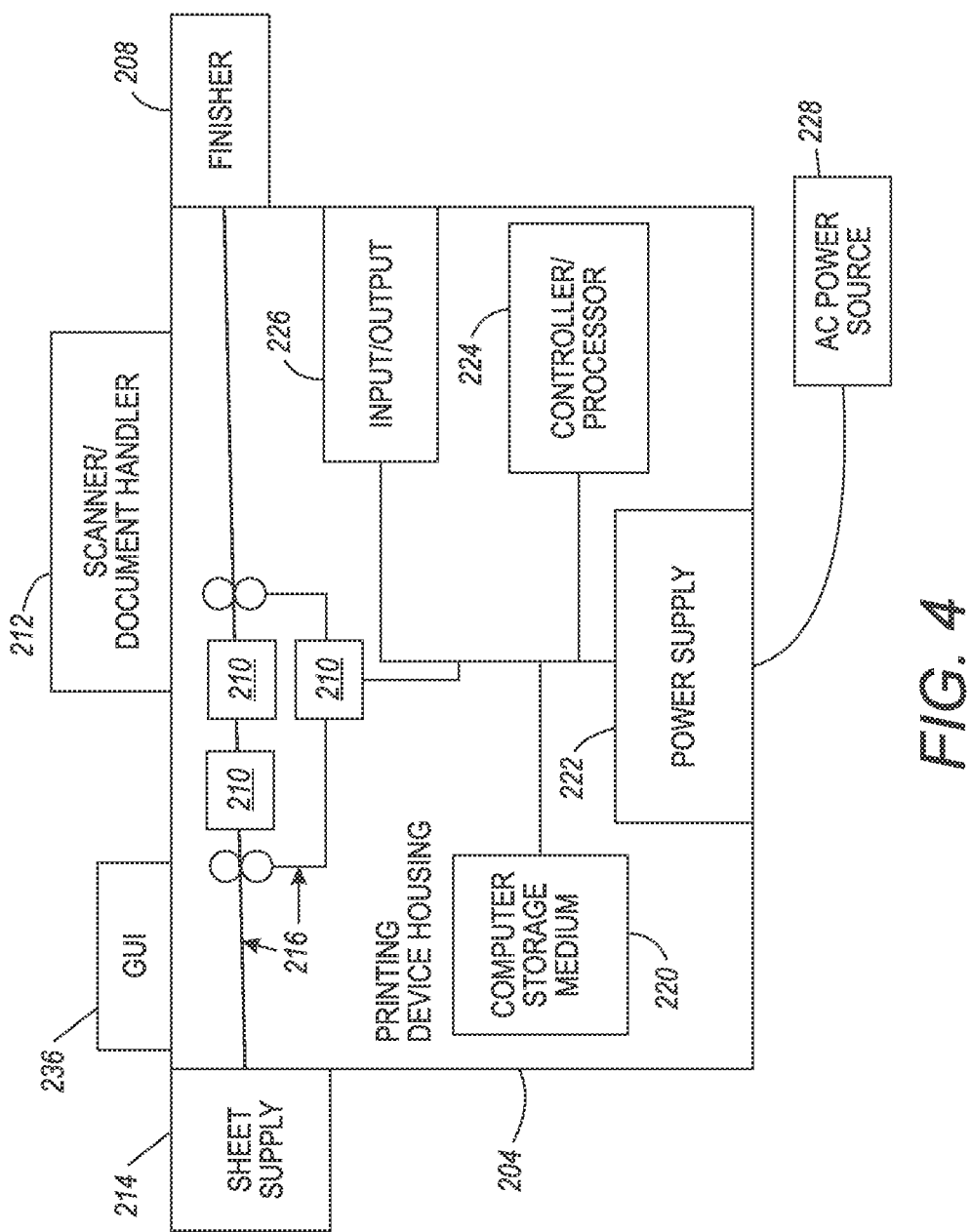
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, as shown above, various computerized devices herein include an interface device 226 (e.g., an input/output device) receiving an electronic document. The electronic document again comprises reusable items. A processor 224 is operatively connected to the interface device 226. The processor 224 renders the electronic document into a printer-ready format to produce a printer-ready document. The interface device 226 outputs the printer-ready document from the computerized device.

The rendering process defines such reusable items that are in the electronic document in a way that each of the reusable includes all graphic attributes needed to reproduce the reusable items independently of external conditions (such as the graphic state of a page in a printer-ready document). Further, this process creates objects for the reusable items within the printer-ready document as the reusable items are encountered during the rendering. The objects are therefore created to be uninfluenced by the graphic state of the current page in the printer-ready document. The methods also store the objects in a non-transitory storage medium (e.g., library) of the computerized device as the objects are created. Then, as the reusable items are re-encountered during the rendering process, these methods simply reference the previously created object in the library.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving an electronic document into a computerized device, said electronic document comprising reusable items;
    rendering said electronic document into a printer-ready format using said computerized device to produce a printer-ready document; and
    outputting said printer-ready document from said computerized device,
    said rendering comprising:
        creating objects for said reusable items within said printer-ready document as said reusable items are encountered during said rendering, said creating forming said objects to include all graphic attributes needed to reproduce said objects independently of a graphic state of a page in said printer-ready document;
        storing said objects in a non-transitory storage medium of said computerized device as said objects are created; and
        as said reusable items are re-encountered during said rendering, referencing only a previously created object in said non-transitory storage medium, independently of said graphic state of a page in said printer-ready document, to reproduce said previously created object.

2. The method according to claim 1, said reusable items comprising at least one of graphical items and text items.

3. The method according to claim 1, said printer-ready document being independent of applications used to create said electronic document.

4. The method according to claim 1, said graphic state comprising graphic parameters including line attributes, clipping paths, coordinate systems, color spaces, and text attributes.

5. The method according to claim 1, said electronic document comprising a variable data print job used to create copies of a main document, and ones of said copies being different from one another based on variable data within said variable data print job.

6. A method comprising:
receiving an electronic document into a computerized device;
defining reusable items in said electronic document to include all graphic attributes needed to reproduce said reusable items independently of external conditions, using said computerized device;
rendering said electronic document into a printer-ready format using said computerized device to produce a printer-ready document, said external conditions comprising a graphic state of a page in said printer-ready document; and
outputting said printer-ready document from said computerized device,
said rendering comprising:
creating objects for said reusable items within said printer-ready document as said reusable items are encountered during said rendering, said creating forming said objects to include all graphic attributes needed to reproduce said objects independently of said graphic state of a page in said printer-ready document;
storing said objects in a non-transitory storage medium of said computerized device as said objects are created; and
as said reusable items are re-encountered during said rendering, referencing only a previously created object in said non-transitory storage medium, independently of said graphic state of a page in said printer-ready document, to reproduce said previously created object.

7. The method according to claim 6, said reusable items comprising at least one of graphical items and text items.

8. The method according to claim 6, said printer-ready document being independent of applications used to create said electronic document.

9. The method according to claim 6, said graphic state comprising graphic parameters including line attributes, clipping paths, coordinate systems, color spaces, and text attributes.

10. The method according to claim 6, said electronic document comprising a variable data print job used to create copies of a main document, and ones of said copies being different from one another based on variable data within said variable data print job.

11. A computerized device comprising:
an interface device receiving an electronic document, said electronic document comprising reusable items;
a processor operatively connected to said interface device,
said processor rendering said electronic document into a printer-ready format to produce a printer-ready document,
said interface device outputting said printer-ready document from said computerized device,
said rendering comprising:
creating objects for said reusable items within said printer-ready document as said reusable items are encountered during said rendering, said creating forming said objects to include all graphic attributes needed to reproduce said objects independently of a graphic state of a page in said printer-ready document;
storing said objects in a non-transitory storage medium of said computerized device as said objects are created; and
as said reusable items are re-encountered during said rendering, referencing only a previously created object in said non-transitory storage medium, independently of said graphic state of a page in said printer-ready document, to reproduce said previously created object.

12. The computerized device according to claim 11, said reusable items comprising at least one of graphical items and text items.

13. The computerized device according to claim 11, said printer-ready document being independent of applications used to create said electronic document.

14. The computerized device according to claim 11, said graphic state comprising graphic parameters including line attributes, clipping paths, coordinate systems, color spaces, and text attributes.

15. The computerized device according to claim 11, said electronic document comprising a variable data print job used to create copies of a main document, and ones of said copies being different from one another based on variable data within said variable data print job.

16. A computerized device comprising:
an interface device receiving an electronic document;
a processor operatively connected to said interface device,
said processor rendering said electronic document into a printer-ready format to produce a printer-ready document,
said interface device outputting said printer-ready document from said computerized device,
said rendering comprising:
defining reusable items in said electronic document to include all graphic attributes needed to reproduce said reusable items independently of external conditions, using said computerized device, said external conditions comprising a graphic state of a page in said printer-ready document;
creating objects for said reusable items within said printer-ready document as said reusable items are encountered during said rendering, said creating forming said objects to include all graphic attributes needed to reproduce said objects independently of said graphic state of a page in said printer-ready document;
storing said objects in a non-transitory storage medium of said computerized device as said objects are created; and
as said reusable items are re-encountered during said rendering, referencing only a previously created object in said non-transitory storage medium, independently of said graphic state of a page in said printer-ready document, to reproduce said previously created object.

17. The computerized device according to claim 16, said reusable items comprising at least one of graphical items and text items.

18. The computerized device according to claim 16, said printer-ready document being independent of applications used to create said electronic document.

19. The computerized device according to claim 16, said graphic state comprising graphic parameters including line attributes, clipping paths, coordinate systems, color spaces, and text attributes.

20. The computerized device according to claim 16, said electronic document comprising a variable data print job used to create copies of a main document, and ones of said copies being different from one another based on variable data within said variable data print job.

* * * * *